Sept. 8, 1953     J. C. BROWN     2,651,251
SKEWER
Filed Aug. 31, 1950     2 Sheets-Sheet 1
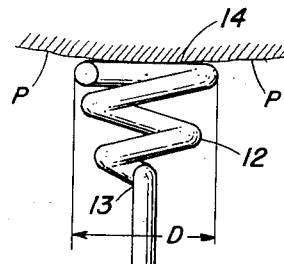
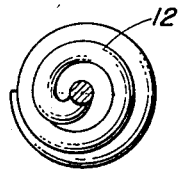
Fig. 2.
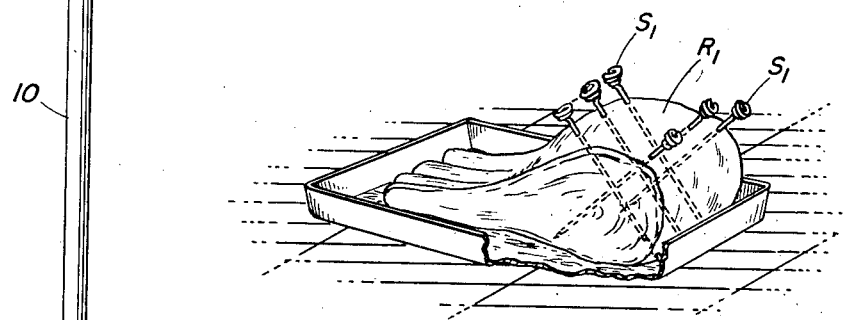
Fig. 3.
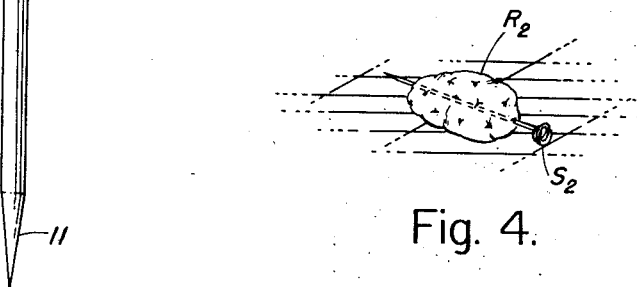
Fig. 4.
Fig. 1.
INVENTOR
John Clark Brown
BY
ATTORNEY Sept. 8, 1953 J. C. BROWN 2,651,251
SKEWER
Filed Aug. 31, 1950 2 Sheets-Sheet 2

INVENTOR
John Clark Brown
BY
Arthur Middleton
ATTORNEY

Patented Sept. 8, 1953

2,651,251

UNITED STATES PATENT OFFICE 2,651,251

SKEWER

John Clark Brown, Upper Montclair, N. J.

Application August 31, 1950, Serial No. 182,451

1 Claim. (Cl. 99—419)

This invention relates to meat cooking aids for effecting a more even distribution of the oven heat throughout a roast than is normally attainable.

Because of the temperature gradient in the roast oven heat must be allowed to overcook the outer portions of the roast in order that the interior or central portion might be cooked sufficiently. That is to say, under customary meat-cooking conditions the interior portion of the roast can only be cooked sufficiently at the price of relatively overcooking the outer zones of the roast with an attendent undesirable shrinkage and drying-out of the meat and therefore loss of meat juices and loss of tastiness. Also the oven temperature must be kept undesirably high in order that heat may penetrate through the outer layers and reach the interior of the roast within a reasonable length of time or reach the interior at a sufficiently high temperature, or else the cooking time must be sufficiently extended to avoid leaving the interior of the roast raw or insufficiently cooked. Indeed, as the carving of the normally cooked roast proceeds it can be observed from slice to slice that the quality, condition, taste, and juiciness of the meat changes from being well done or overdone to being too raw and perhaps too tough, so that it is difficult to meet the average taste for a medium done yet tender and juicy quality. Indeed these extremes of quality in cooked roast become all the more pronounced the larger the roast.

It is among the objects of this invention to provide a cooking aid in the form of means which are simple, practical, efficient, and inexpensive to manufacture, and which are adapted to compensate for or average out the normally occurring temperature gradient in the roast, so that overcooking of its outer zone, shrinkage, and excessive loss of meat juices are avoided, while its taste qualities are improved, and yet cooking time is reduced.

These objects are attained by providing heat conducting channels extending transversely through the roast whereby oven heat can be conducted to the center of the roast considerably faster than it can be conducted by the roast itself. This invention provides such channels in the form of spikes or skewers thrust into and through the roast, these skewers to be of a material, for example aluminum, of high heat conductivity as compared with the heat conductivity of the roast itself.

By the use of the cooking aid according to this invention the oven heat penetrates the roast from its surface inwardly, while the heat channelled to the center by the skewers penetrates the roast from the center outwardly; in other words, while the cooking proceeds from the outside in, it also proceeds from the inside out, thereby averaging out to a substantial degree the otherwise occurring temperature gradient in the roast.

However, in the operation of this cooking aid there emerges a practical problem, namely that of maintaining a maximum of oven heat supply to, into, and through the skewer, or to provide for a transfer of oven heat into the skewer head portion that protrudes from the roast at a rate sufficient to satisfy the high heat conductivity of the skewer material and the transfer and dispersion of that heat into the surrounding meat and meat juices through the interface between the skewer metal and the meat juices.

Indeed, the problem that presents itself here is one not only of heat conductivity of certain materials of substances per se, but also one of heat transfer from one medium or substance to another through the respective interface.

For the present consideration there can be discerned a heat transfer from air or gaseous medium to the skewer, that is the transfer of oven heat into the head portion of the skewer, by way of the interface between the two media, the conduct of heat through the skewer and the transfer of thus conducted heat from the skewer to and into the surrounding meat and juices by way of the interface.

Briefly then the use of the skewer involves heat transfer from gas to metal, heat conduct through the metal, and heat transfer from the metal to the meat and meat juice.

Since heat transfer from a gaseous medium to metal is relatively slow and indeed much slower than the transfer of heat from metal to liquid or to meat, and the juicy meat may be considered as a combination of liquid and solid with the rate of heat flow (heat conductivity) through the metal relatively high, a bottleneck is encountered at the gas-metal interface, if the net transfer of oven heat through the skewer into the roast is to be a desired maximum.

According to one feature a sufficiently large gas-metal interface is provided in a compact, practical, as well as inexpensive skewer by forming a length of heavy stiff wire at one end with a sharpened point for thrusting into the meat, and at the other end with a cone-shaped spiral wound head portion the terminal wide end or base of which defines a circular area against which the user's palm may be conveniently pressed when thrusting the skewer into the roast. Also the spiral shaped head portion presents a convenient compact button-like handle whereby the skewer may be extracted from the roast.

This feature combines in the characteristically shaped head or handle portion of the skewer convenience as well as cheapness and compactness along with providing an adequate heat transferring interface such as presented by the surface of the developed appreciable length of the spiral-shaped head portion.

The mass of metal of the spiral-wound head also acts as a compact heat accumulator or heat reservoir encouraging the flow of heat through the skewer into the interior of the roast.

In the drawings:

Figure 1 is side view of the skewer.

Figure 2 is a cross sectional view of the skewer taken on line 2—2 of Figure 1.

Figure 3 is a perspective view showing a set of skewers applied to a large size roast on a pan.

Figure 4 is a perspective view showing a single skewer applied to small size roast.

Figure 5:
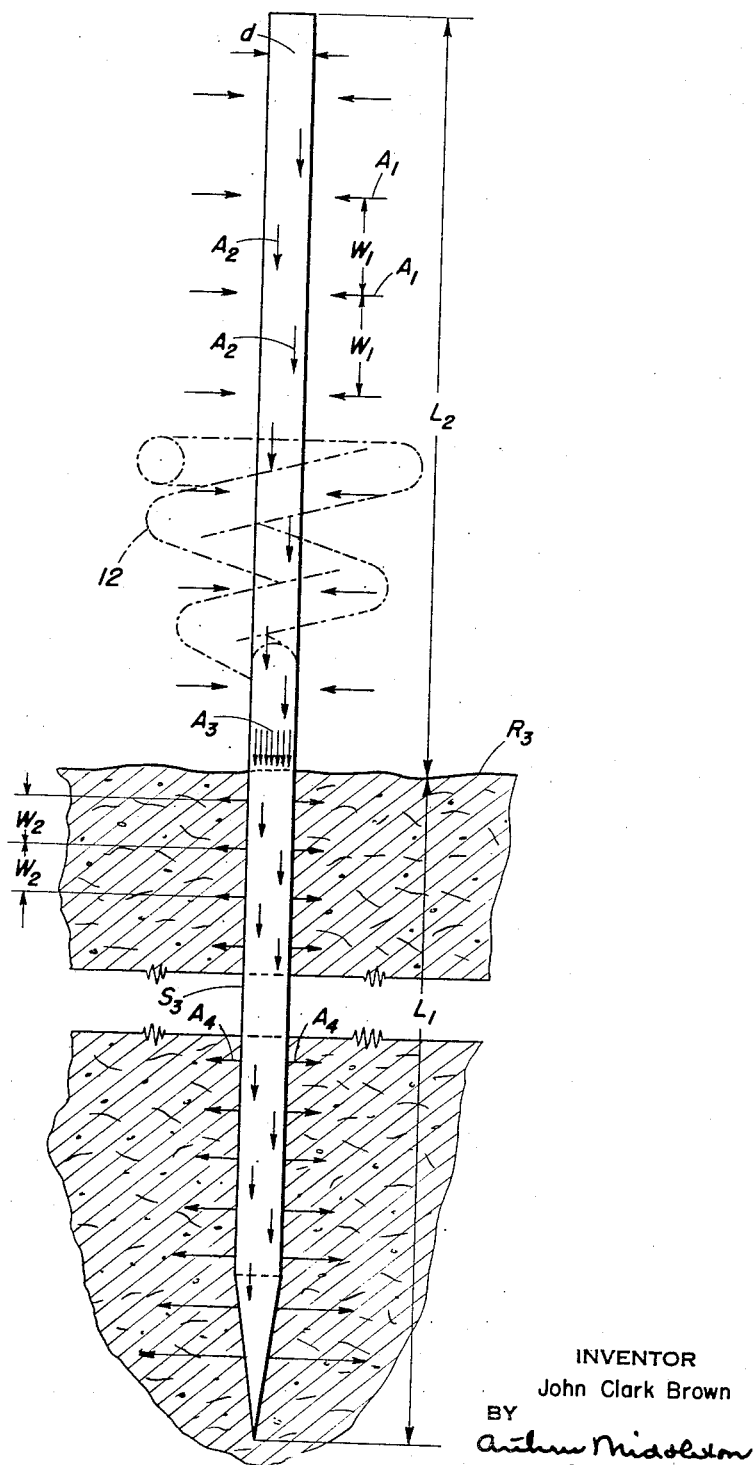
Figure 5 is a greatly enlarged side view of the skewer showing the spiral-shaped head developed, and the heat transfer into and out of the skewer, as well as the heat conduct through and along the skewer spirally indicated by arrows.

The skewer shown in the drawing figures is made from a straight length (see Figure 5) of heavy wire of a diameter D and comprises (see Figure 1) a straight body portion or shaft $10$ provided with a sharply pointed foot end portion $11$ and with a spirally wound head end portion or head $12$ of the wire. The spirally wound head $12$ constitutes a handle whereby the skewer can be readily manipulated when either thrusting it into a roast or extracting it therefrom.

The spirally wound head is in the shape of an inverted cone as if wound around a conical mandrel, having its apex $13$ emerge with the shaft $10$ and its base $14$ define a circular area of a diameter D which area may conveniently receive the pressure of the user's palm indicated at P.

Figure 3 shows a large roast R pierced by a set of skewers $S_1$ in interesting fashion indicating a manner in which the desired improved cooking conditions can be attained in a roast substantially irrespective of its size. Figure 4 illustrates the manner of cooking a small size roast $R_2$ with only one skewer $S_2$ piercing it longitudinally.

Figure 5 illustrates the heat flow and heat transfer conditions whereby even heat is channelled to and reaches the interior of the roast. Therefore a skewer $S_3$ is shown thrust into a roast $R_3$ with a length $L_1$ surrounded by the meat and a straight length $L_2$ protruding from the roast, the length $L_2$ here being hypothetically shown as the equivalent or developed length of the spirally wound head $12$ merely indicated in dot-and-dash lines.

The surface of the skewer portion $L_2$ presents in effect the interface through which heat from the surrounding gaseous medium or to some extent by radiation must enter the metal of the skewer proper, such heat transfer from the one medium to the other being indicated by arrows $A_1$ with the wide spacing $W_1$ of the arrow roughly indicating the relatively slow specific rate of heat transfer between these media.

Arrows $A_2$ shown within the skewer point in a direction parallel to the longitudinal axis of the skewer and towards the interior of the roast that is in a direction towards a region of relatively lower temperature. A group of densely spaced arrows $A_3$ inside the skewer indicate the relatively high conductivity of the metal and represent an accumulation of heat flow lines at the surface line of the roast. Furthermore, the mass of metal represented by the length $L_2$ acts as a heat accumulator or heat reservoir compacted into the spiral shape which helps to maintain a relatively high temperature differential between head end and the foot end of the skewer, expediting the flow of heat towards the interior of the roast.

Finally there are indicated arrows $A_4$ pointing from the surface of the length $L_1$ of the skewer outwardly, that is into the surrounding meat to illustrate the transfer and dispersion of the skewer conducted heat into the roast. The relatively greater rate of heat transfer from metal to meat or meat juices is indicated by the greater density or narrower spacing $W_2$ of the arrows $A_4$ from one another, the spacing $W_2$ being narrower than the spacing $W_1$ between arrows $A_1$. Indeed, the heat transfer represented by arrows $A_4$ is relatively higher towards the very interior of the roast because of the relatively higher temperature differential between the metal and the surrounding meat and also because of the heat conducting juiciness of the meat, whereas near the surface of the roast the meat is hotter and hence the temperature differential and heat transfer are not as great.

This differentiation in the rates of heat transfer from metal to meat with respect to progressive zones in the roast operates towards quickly averaging out the temperature gradient, and is indicated by arrows $A_4$ in the high temperature zone near the surface of the roast being shorter than arrows $A_4$ in the interior or low temperature zone.

An advantage is derived in the use of this skewer from the spiral head provided according to this invention, where the skewer carrying the roast or chunks of meat is to be supported endwise by respective edges of the cooking pan. That is to say, this spiral head provides mechanical means for preventing it from slipping off the edge into the pan by engaging the respective edge of the pan in a manner securing it against such displacement or slippage irrespective of the angle under which the shank of the skewer is placed, for example, pointing upwards towards the flame. Displacement is prevented by the edge of the pan lodging in the space between two adjacent turns of the spiral head.

What I claim is:

A skewer for aiding the cooking of a roast in the manner substantially as herein described, comprising a unitary length of wire having a stiff wire shank portion for penetrating the roast and conducting heat into the same and a conical spiral heat accumulating wire head and handle portion, said conical spiral portion including at least one and one half turns so as to provide a pair of axially displaced juxtaposed arcuate sections between which the edge portion of a cooking pan is adapted to be engaged, whereby the roast can be held from movement relative thereto and the heat of the pan can be transferred by metal-to-metal contact to the skewer, the terminal wide end of the conical spiral portion defining a substantially circular area against which the user's palm can be pressed when thrusting the skewer into the roast.

JOHN CLARK BROWN.

References Cited in the file of this patent

UNITED STATES PATENTS

| Number | Name | Date |
| --- | --- | --- |
| 732,470 | Tatham | June 30, 1903 |
| 1,113,929 | Brown | Oct. 13, 1914 |
| 1,308,253 | Oftedahl | July 1, 1919 |
| 1,612,252 | Beverly | Dec. 28, 1926 |
| 1,915,962 | Vaughn | June 27, 1933 |
| 2,404,166 | Danilla | July 16, 1946 |

FOREIGN PATENTS

| Number | Country | Date |
| --- | --- | --- |
| 166,987 | Great Britain | July 27, 1921 |